United States Patent
Maier

(10) Patent No.: US 7,009,408 B2
(45) Date of Patent: Mar. 7, 2006

(54) FILL LEVEL MEASURING DEVICE USING MICROWAVES

(75) Inventor: Winfried Maier, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/496,841

(22) PCT Filed: Nov. 30, 2002

(86) PCT No.: PCT/EP02/13540

§ 371 (c)(1),
(2), (4) Date: Nov. 12, 2004

(87) PCT Pub. No.: WO03/048696

PCT Pub. Date: Jun. 12, 2003

(65) Prior Publication Data

US 2005/0062483 A1    Mar. 24, 2005

(30) Foreign Application Priority Data

Dec. 4, 2001    (DE)    ............................. 101 59 394

(51) Int. Cl.
    *G01R 27/04*    (2006.01)
(52) U.S. Cl. ...................................... 324/644; 324/642
(58) Field of Classification Search ............ 73/290 V; 324/642, 644; 343/785, 786
See application file for complete search history.

(56) References Cited

U.S. PATENT DOCUMENTS

| 5,877,663 | A  | * | 3/1999  | Palan et al. ................. 333/252 |
| 6,499,346 | B1 | * | 12/2002 | Wien et al. ............... 73/290 R |
| 6,750,657 | B1 | * | 6/2004  | Griessbaum et al. ........ 324/642 |
| 6,834,546 | B1 | * | 12/2004 | Edvardsson ............... 73/290 V |
| 2002/0066314 | A1 | * | 6/2002 | Lubbers .................... 73/290 R |

FOREIGN PATENT DOCUMENTS

| DE | 38 05 766 A1 | 9/1989 |
| DE | 44 37 374 A1 | 4/1996 |
| DE | 298 12 024 U1 | 10/1998 |
| DE | 100 28 807 A1 | 11/2001 |
| EP | 1058 341 A1 | 12/2000 |

* cited by examiner

Primary Examiner—Walter Benson
(74) Attorney, Agent, or Firm—Bacon & Thomas

(57) ABSTRACT

A fill level measuring device working with microwaves, having an antenna for transmitting, or for transmitting and receiving, microwaves. The antenna has a metallic outer conductor and a ceramic inner conductor. The inner conductor is secured in a pressure-tight and gas-sealed manner in the outer conductor. A coating of a fluorothermoplastic is provided on the inner conductor or in the outer conductor. The inner conductor is secured in the outer conductor by means of a warm-pressed fit, and the inner conductor and the outer conductor have conical surfaces of equal shape in the region of the pressed fit.

2 Claims, 2 Drawing Sheets

FILL LEVEL MEASURING DEVICE USING MICROWAVES

FIELD OF THE INVENTION

The invention relates to a fill level measuring device working with microwaves.

BACKGROUND OF THE INVENTION

In fill level measurement, microwaves are transmitted by means of an antenna onto the surface of a fill substance, and the echo waves reflected at the surface are received. An echo function is formed, representing the echo amplitudes as a function of distance. The echo function is then used to determine the probable useful echo and its travel time. From the travel time, the separation between the fill substance surface and the antenna is determined.

In the technology of industrial measurements, dielectric rod antennas and horn antennas are regularly used for the transmitting and/or receiving. Frequently, a housing is applied, which exhibits a housing section having the geometry of a short-circuited waveguide.

An exciter element extends into the housing section with such waveguide geometry, and microwaves are transmitted and/or received through the section over the exciter element. In the case of transmitting, the microwaves are produced by a remotely arranged microwave generator and transported to a transmitting element, or to a transmitting- and receiving-element, over coaxial conductors. In the antenna, there occurs by way of the transmitting element, or the transmitting- and receiving-element, a conversion of fed, conductor-bound microwaves into microwaves that propagate in free space, and vice versa.

In the case of a horn antenna, there follows on the housing a funnel-shaped section widening in the container-facing direction to form the horn. In the case of the rod antenna, a rod of a dielectric material is provided, pointing into the container. Usually, the interior of the housing is almost completely filled by an insert of a dielectric. In the case of the horn antenna, the insert has a cone-shaped end pointing into the container. In the case of rod antennas, the rod-shaped antenna pointing into the container is connected to the insert.

The housing is regularly made of metal and will hereinafter be referred to as the outer conductor. The dielectric insert and its cone-shaped end, or the dielectric insert and the rod-shaped antenna connected thereto, as the case may be, will hereinafter be referred to as the inner conductor.

FIG. 1 shows schematically a container 1, the left side of which shows a fill level measuring device 3 equipped with a horn antenna and the right side of which shows a fill level measuring device 5 equipped with a rod antenna.

If chemically aggressive, easily ignitable or explosive media are present in the container, then a pressure-tight and gas-sealed closure of the interior of the container is required. The same is true, when the container is pressurized. Correspondingly, the inner conductor must be anchored pressure-tightly and gas-sealed in the outer conductor, in order that the container interior be completely separated from the container exterior.

Since the inner conductor is made of a dielectric and the outer conductor of a metal, different materials having different coefficients of thermal expansion come together here.

U.S. Pat. No. 5,877,663 describes a fill level measuring device working with microwaves, having an antenna for transmitting, or for transmitting and receiving, microwaves, which has a metallic outer conductor and a ceramic inner conductor. The inner conductor is secured in the outer conductor by means of a press- or shrink-fit, and, since these methods alone offer an inadequate level of safety, additionally by means of brazing.

SUMMARY OF THE INVENTION

It is an object of the invention to provide a fill level measuring device working with microwaves, in which the inner conductor is secured in a pressure-tight and gas-sealed manner in the outer conductor.

To this end, the invention resides in a fill level measuring device working with microwaves, having
- an antenna for transmitting, or for transmitting and receiving, microwaves,
- which has a metallic outer conductor and a ceramic inner conductor, and
- a coating of a fluorothermoplastic on the inner conductor or in the outer conductor,
- wherein the inner conductor is secured in the outer conductor by a warm-pressed fit, and
- the inner conductor and the outer conductor have equally-shaped conical surfaces in the region of the pressed fit.

According to a further development, perfluoroalkoxy (PFA) is used as the fluorothermoplastic.

The invention additionally resides in a method for manufacturing a fill level measuring device working with microwaves, in which
- the metallic outer conductor is heated to a temperature near but beneath a sinter temperature of the coating, and
- the ceramic inner conductor is heated to a temperature approximately equal to a maximum temperature at which the coating is still durable over time.

An advantage of the invention is that, by a very simple and, consequently cost-favorable technique, a gas-sealed and pressure-tight seal between the inner conductor and the outer conductor is created.

A further advantage is that the fluorothermoplastics are chemically very durable and usable at, for plastics, very high temperatures.

The invention and further advantages will now be explained in greater detail on the basis of the figures of the drawing, in which an example of an embodiment is presented; equal parts are provided in the figures with equal reference characters.

Description of The Preferred Embodiment

Figure 1:
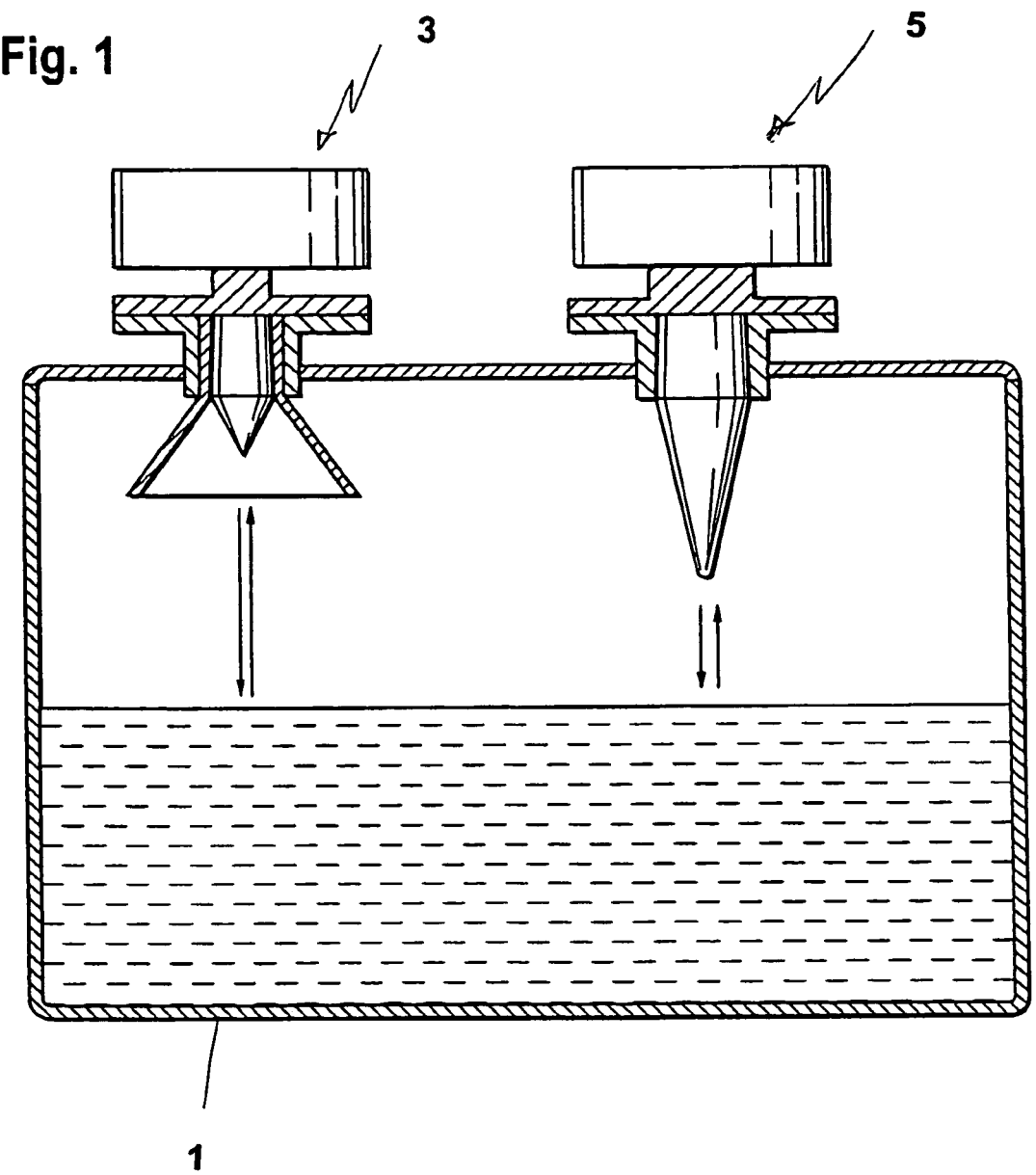
FIG. 1 shows, schematically, mounted on a container, a fill level measuring device with a horn antenna and, mounted on the same container, a fill level measuring device with a rod antenna.

FIG. 1 shows schematically a container 1, the left side of which shows a fill level measuring device 3 equipped with a horn antenna and the right side of which shows a fill level measuring device 5 equipped with a rod antenna.

Figure 2:
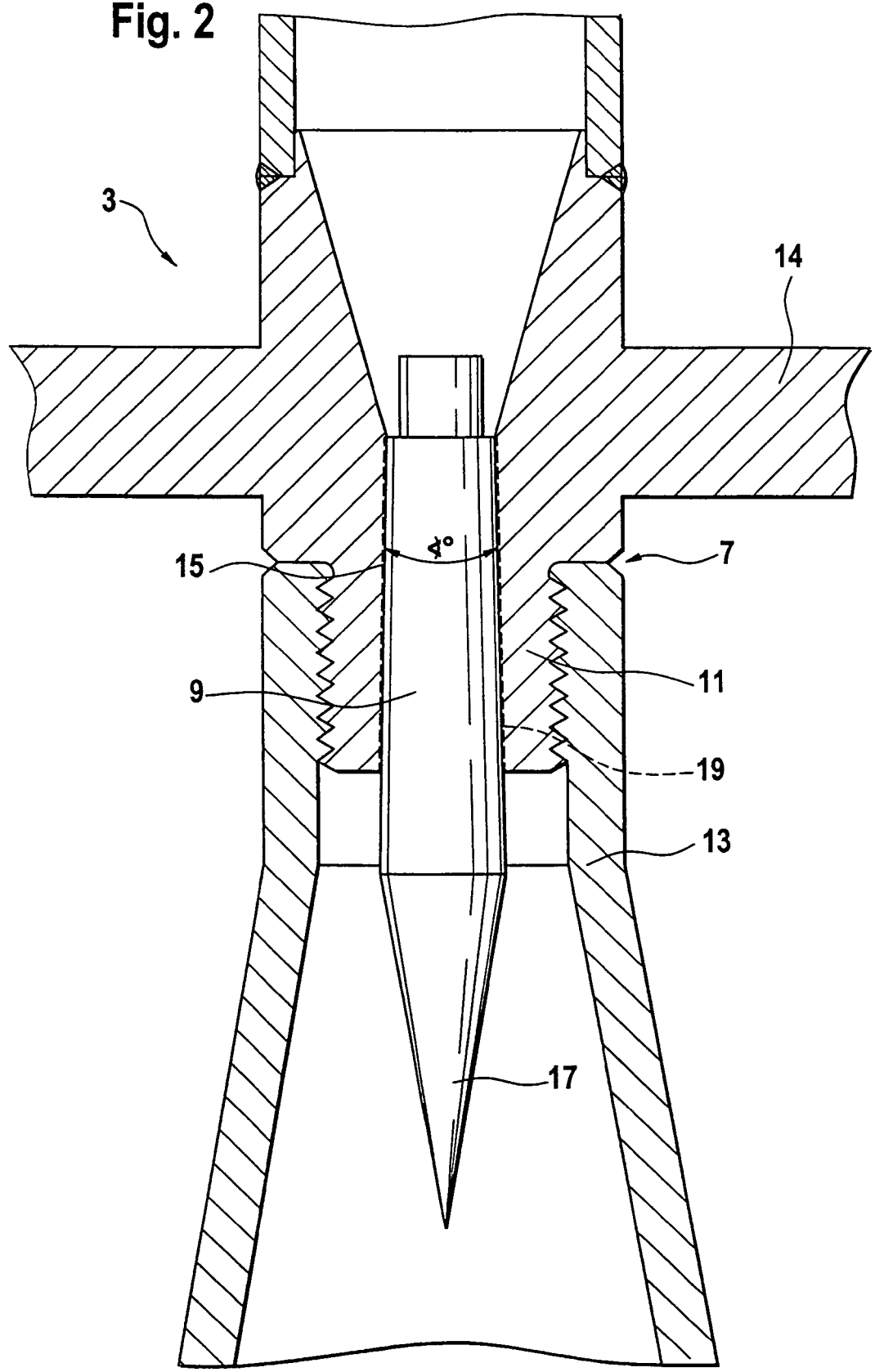
FIG. 2 shows, schematically, the inner and outer conductors of a fill level measuring device of the invention.

FIG. 2 is a detail drawing of the fill level measuring device with horn antenna, as presented in FIG. 1. The invention is analogously applicable to the case of rod antennas. The fill level measuring device has an antenna for transmitting, or for transmitting and receiving, microwaves. The antenna includes a metallic outer conductor 7 and a ceramic inner conductor 9.

The metallic outer conductor 7 has in the illustrated embodiment a first section 11 and a second section 13. The first section 11 is essentially cylindrical on the outside. The first section 11 has a flange 14, by which the fill level measuring device 3 can be secured to the container 1. The second section 13 is a funnel-shaped horn and is screwed onto an end of the first section 11 directed into the container 1.

The inner conductor 9 is inserted into the first section 11 and secured there by means of a warm-pressed fit. It has in the region of the pressed fit an outer, slightly conical surface 15, whose shape equals the shape of an inner, slightly conical surface of the outer conductor 7 in the region of the press fit. The cones are formed such that cone diameter decreases in the direction away from the container. The inner conductor 9 terminates in the horn of the outer conductor 7 with a cone-shaped tip 17.

A coating 19 of fluorothermoplastic is provided on the inner conductor 9. Alteratively, the outer conductor 7 can be provided in the region of the press fit with a coating.

Preferably, perfluoroalkoxy (PFA) is used for the coating. Perfluoroalkoxy (PFA) is chemically highly durable and useable at temperatures up to 260° C.

The coating 19 is e.g. applied beginning with a primer of layer thickness 10 $\mu$m to 20 $\mu$m on the de-greased, sand-blasted region to be coated. On top of this primer, a cover layer of 20 $\mu$m to 30 $\mu$m thickness is sintered in place at a temperature of 360° C. to 400° C. In total, layer thicknesses of up to about 100 $\mu$m can be applied in this manner.

The fill level measuring device is then produced by heating the metallic outer conductor 7 to a temperature near but beneath a sinter temperature of the coating 19. The sinter temperature of perfluoroalkoxy (PFA) lies at about 360° C. to 400° C. Thus, for a coating 19 of perfluoroalkoxy (PFA), the outer conductor 7 would be heated to e.g. a temperature of 300° C.

The ceramic inner conductor 9 is heated to a temperature approximately equal to a maximum temperature at which the coating 19 is still durable over time. For perfluoroalkoxy (PFA), the inner conductor 9 could be heated e.g. to about 150° C.

Following heating, the inner conductor 9 is pushed into the outer conductor 7. Through the action of the heat, the coating 19 is melted superficially and fits the given geometries and surfaces of the inner and outer conductors 7, 9 optimally. Following assembly, the antenna is cooled in air or in a water bath to ambient temperature.

The conical shaping of the inner conductor 9 and the outer conductor 7 in the region of the pressed fit significantly simplifies the introduction of the inner conductor 9 into the outer conductor 7. The heating melts the coating 19 superficially, so that possibly existing score marks and/or cone differences and similar irregularities get filled-out pore-free.

The invention claimed is:

1. A fill level measuring device working with microwaves, having an antenna for transmitting, or for transmitting and receiving, microwaves, said antenna including:
   a metallic outer conductor;
   a horn mounted to said metallic outer conductor;
   a ceramic inner conductor; and
   a coating of a fluorothermoplastic on said ceramic inner conductor or in said metallic outer conductor, wherein:
   said ceramic inner conductor is secured in said metallic outer conductor by a warm-pressed fit; and
   said ceramic inner conductor and said metallic outer conductor have equally-shaped conical surfaces in the region of the press fit.

2. The fill level measuring device as claimed in claim 1, wherein:
   perfluoroalkoxy (PEA) is used as the fluorothermoplastic.

* * * * *